Nov. 7, 1967    E. A. WITT ET AL    3,350,800

CREDIT CARD IDENTIFICATION

Filed Sept. 15, 1965

INVENTORS.
Edward A. Witt
Harry C. Herbig
BY
Green, McCallister & Miller

THEIR ATTORNEYS

3,350,800
CREDIT CARD IDENTIFICATION
Edward A. Witt, 142 W. Prospect Ave., Pittsburgh, Pa. 15205, and Harry C. Herbig, 242 Hays Road, Bridgeville, Pa. 15017
Filed Sept. 15, 1965, Ser. No. 487,421
13 Claims. (Cl. 40—2.2)

ABSTRACT OF THE DISCLOSURE

A customer's credit card having an incorrect code indicium thereon is placed by a vendor on a matching receiver having a plurality of code indicia thereon. The vendor determines the correct or assigned code indicium of the card by viewing the code indicium on the receiver that is in alignment with the incorrect indicium of the card. Cooperating offset portions of the card and the receiver assure proper alignment of the card with respect to the receiver, and the receiver has an offset portion to facilitate subsequent removal of the credit card from its positioning thereon.

---

Figure 1:
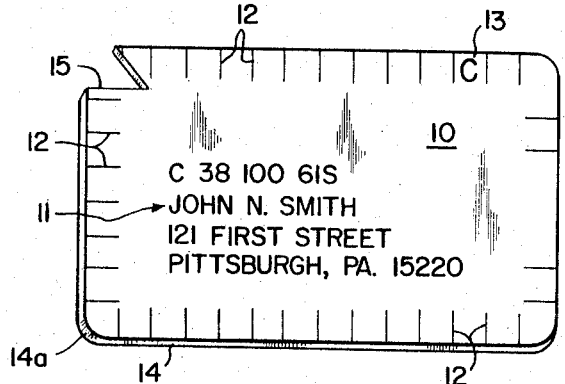

This invention relates to credit card identifying means for providing protection from the standpoint of the owner and the vendor against its misuse and to a system or method of utilizing a credit card to provide improved protection.

An important phase of our invention pertains to an improved credit card and credit card assembly or utilization which provides a code identification check as to the person presenting a card for a credit purchase, a money advance or for check cashing service.

Credit cards have come into extensive use in our present economic system, as evidenced by the various plans available and the number of cards and organizations that are in existence. However, it is generally conceded that misuse and fear of misuse of lost or stolen cards is a threat to both the stability and growth of the use of personal credit cards. The issuers recognize the sales potential and the competitive advantages which are derived from the use of such cards and thus have been willing to assume a certain percentage of loss through misuse. They have attempted to minimize misuse by warning the legitimate owner of the card that he must take extreme care and, if it is lost, that he should immediately notify the issuer so that steps may be taken to prevent further credit being given on the basis of it. The user, however, is exposed to a definite liability during the interim period between the loss of the card and notification of the issuer.

The employment of the signature of the user on the face of the card and the requirement of the user to apply his signature to a charge slip is the common method to combat misuse. This, however, has been somewhat ineffective and has not been strongly enforced for a number of reasons. In the first place, it prevents authorized use of the card by other members of the owner's family, and it attempts to make handwriting experts out of clerks, cashiers, and filling station attendants who lack such training and are frequently being pressed by other customers for service. It also has the disadvantage that it exposes the signature of the user to other fraudulent misuse when the card is taken by a dishonest person.

We have recognized the need for an improved way of enabling a clerk or attendant to check or determine whether or not the present holder of a credit card is the correct or true owner thereof, and it has thus been an object of our invention to provide a solution to the problem presented by a new or improved approach thereto.

Another object of our invention has been to provide an efficient and effective means of at least minimizing the annual loss of thousands of dollars through misuse of lost or stolen credit cards, the adverse public relations that result and, in general, to make the utilization of credit cards more efficient and practical.

A further object of our invention has been to develop, employ and make practical the employment of an indicia code system in connection with credit cards which will simplify and speed up the checking of the true ownership thereof, as by a clerk or attendant.

A still further object of our invention has been to devise a credit card and card receiver assembly which will provide a positive coded indicator to the clerk or attendant as to the proper ownership thereof, in a simplified and easy manner, and in such a way to confuse a wrongful holder thereof.

These and other objects of our invention will appear to those skilled in the art from the illustrated embodiment thereof and the appended claims.

Figure 2:
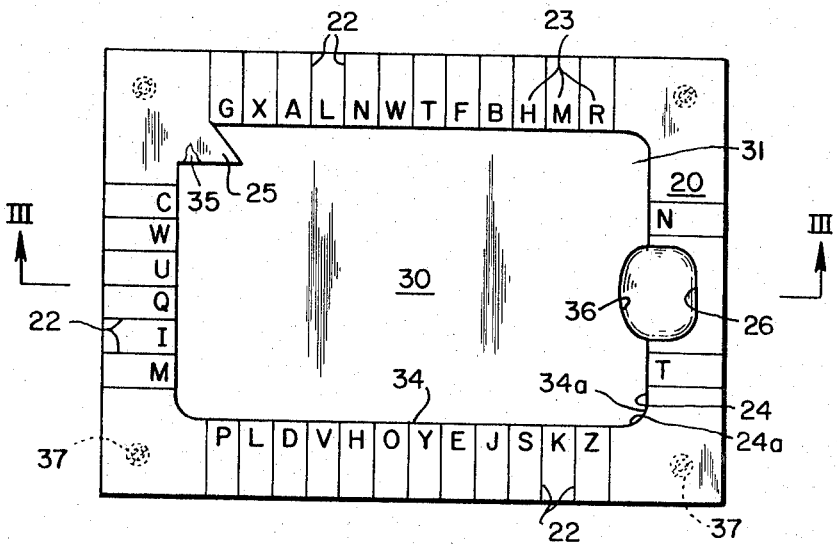
Figure 3:
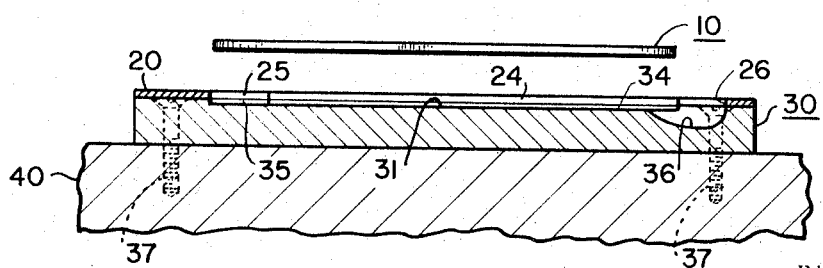

In the drawings, FIGURE 1 is a top plan view showing a credit card employing our invention; this view shows an actual working scale of the card;

FIGURE 2 is a top plan view on the scale of FIGURE 1 showing a matching coded receiver for the credit card of FIGURE 1; and FIGURE 3 is a side view in elevation and partial section on the scale of FIGURES 1 and 2, showing the credit card of FIGURE 1 in alignment above the receiver of FIGURE 2, ready to be placed in a properly aligned matching relation within the receiver; this view also discloses associated base support means.

In carrying out our invention, we employ a credit card 10 which, on its upper wide side face, is provided with a code indicium and which is utilized with a matching member, tray or receiver having code indicia along its edge. The card is to be placed in an aligned relation with the matching member by the clerk or attendant when it is presented by the person desiring credit, and after the clerk has asked the person what his code indicium is. The clerk, by placing the card in the receiver which is retained at the establishment, such as at a gas station, department store, etc., then reads-off the correct code indicium for the particular card from an aligned one which is carried by his matching member, receiver or tray, with the code indicium on the card. If the thus-determined correct code indicium is the same as given by the person presenting the card, then the clerk can extend credit; if not, he can refuse credit.

In employing our card system, the card 10 will have a central portion on its upper face on which the true owner's name, address and the number of the card may be embossed or otherwise imprinted or made visible. As the particular store or establishment owner desires, he may require the customary signature of the person requiring credit. However, our simplified system does not require the signature of the user and, in this sense, speeds-up the utilization of credit cards and saves the clerk time.

In the embodiment of our invention shown in the drawings, the credit card 10 is shown as having a card body provided with opposed upper and lower substantially planar wide side faces and surrounding narrow edge faces, represented by 14. The card may be of generally polygonal shape, but is shown specifically of substantially rectangular shape with its straight edge faces 14 as having rounded corners 14a. The card 10 also has means, such as offset portion 15, for matching it in a complementary manner with aligning means, such as 25, of a matching member, receiver, holder or tray. In FIGURE 1, the means 15 is shown in the form of an angular-shaped notch or slot in a corner edge of the card 10, and the means 25 of FIGURE 2 is shown as an angle-shaped projection adapted to fit within such notch portion.

The card 10 may be of any suitable construction, such as of relatively thin plate metal, resin-impregnated cardboard or of resin material (such as a sandwich whose members are heat-pressed into a unitary whole). As shown in FIGURE 1, the upper surface of the card 10 has spaced-apart transverse guide lines extending from its edges along its upper wide side face to define a series of compartments 13 therealong. These compartments serve to receive at least one code indicia, such as illustrated by the letter C of FIGURE 1.

The code indicium C of the card 10 is merely representative and its location in a particular compartment of the card 10 is merely representative, in that different code indicia may be used and used in different individual compartments 13, as desired. However, the main purpose is to provide at least one code indicium in at least one department 13 which is to be matched with at least one code indicium of a compartment 23 of the tray, matching member or receiver with which the card 10 is to be matched or within which it is to be placed.

Assuming that the code indicium C of the card 10 of FIGURE 1 is used, then when the card is placed in the receiver or, in other words, matched with the matching member, the corresponding indicium of the latter will be the letter M. This letter will then represent the actual code indicium of the particular owner of the card. In this sense, the indicium C of the card is merely a pointer indicium or indicator for the actual secret indicium that the owner is given when the card is issued to him. There is thus nothing on the card 10 to indicate what the correct indicium or letter is. It is necessary to match the card 10 with particular indicium of a matching member before an actual determination can be made by the clerk as to the correct one.

In FIGURES 2 and 3, we have, for the purpose of illustration, shown a matching receiving member or tray as made up of a top plate or surface member 20 and a base support or bottom member 30. It will be apparent that these members can be of unitary one-piece construction, and that the part represented by the member 20 may be in the form of a metal plate or a decal which is cemented or in another suitable manner secured on a support member such as 30. The matching member 20 is secured on the upper planar face of a support member which may be the upper face of a so-called conventional imprinter or card stamper. The receiver will have code indicia in an aligned spaced relation along at least one inner edge of its central open portion and will also have means, such as 25, for assuring a proper aligned-matched positioning of the card 10 with respect thereto when the card is placed or inserted in position therewith.

In FIGURE 2, the matching member 20 is shown of generally polygonal shape and as having transverse guide lines or graduations 22 in a spaced relation extending from its inside edges along its upper planar face to define compartments 23 within which a group of indicia, such as individual letters, may be placed in at least one line of compartments. The member 20, as shown, has a central open area, as defined by inner edge faces 24 and, for the particular card of FIGURE 1, has a rectangular shape with rounded corner edges 24a.

As illustrated particularly in FIGURE 3, the member or part 20 has its underside in abutment with a support member, block or tray 30 and may be secured in any suitable manner thereto, as by cementing. The support member 30 has a planar upper central face portion 31 to support the lower opposed wide side face of the card 10 when it is placed in position within the receiver means. The receiver may be secured to a table, cash register or other more or less permanent fixture at the retail or credit establishment, as represented by base member 40, by suitable means such as set screws 37.

To facilitate the removal of the card 10 from its matching or aligned position in the receiver, we have shown a slot or recess portion 36 in the member 30 which extends adjacent one end of the assembly beyond the edge of the associated end of a card 10 and into the planar central area or portion 31. Thus, an object such as a finger or thumb may be easily inserted through a cooperatively cutout portion 26 of the upper or indicia carrying or matching member 20 to enable the attendant or clerk to lift up the end of the card 10 and remove it from the receiver assembly.

The receiver, itself, whether it is a unitary member or a combination of members 20 and 30, will have a depth-wise extent in its central opening or open compartment portion 35 (as defined by edge faces 24 and 34) substantially corresponding to the thickness of the card 10, in order that the upper face of the card 10 will be substantially flush with the upper face of, for example the member 20, to facilitate the aligning of the lines 12 and 22 and of their indicia compartments 13 and 23. The central open portion in the receiver will be slightly larger than the card 10 to provide clearance for the insertion and removal of the card.

It will be apparent from the drawings and the above description that the transverse lines along at least one inner edge of the matching member 20 that define compartments therealong are adapted to be matched with corresponding transverse lines and compartments along a cooperating outer edge of the card 10. The lines and the compartments of the card and the matching member are aligned in such a manner that the owner's incorrect indicium (such as the letter C) on the card 10 will then be accurately aligned with a correct owner's indicium (such as the letter M) in one of the compartments of the matching member 20 when the card is placed in an aligned edge-to-edge relation with the matching member 20. Our invention employs the principle of utilizing an incorrect code indicium on the credit card 10 so as to confuse a wrongful holder of the card. As a result, the correct ownership code indicium which the credit agency has allotted or designated for the particular owner of the card can only be determined when the card is properly inserted or matched with the indicia of the matching member or receiver. Since the receiver is only available at the store or establishment from which credit is to be extended, the wrongful holder of the card can only guess at the correct code indicium. This guess is made difficult by reason of the fact, as illustrated in FIGURE 2 of the drawings, that no particular sequential order of indicia is used on the matching member or receiver. Although we have shown letters as the code indicia, it will be apparent that numbers and other distinctive indications may be used as desired. Further, by placing compartment groups and code indicia along the four edges of both the card and the matching member or receiver, we provide a large number of code designations available to the credit agencies, and further tend to confuse an unlawful holder of a particular card.

Although we have shown a particular embodiment of our invention in order to illustrate its principles, it will be apparent to those skilled in the art that various modifications and adaptations may be made without departing from its spirit and scope, as indicated by the appended claims.

What we claim is:

1. An improved credit card for placement in an aligned relation with a matching member to determine whether the holder of the card is the proper owner thereof which comprises, code indicia on the matching member, a card body having a code indicium thereon, and means for accurately aligning said card body with the matching member whereby the code indicium on said card will align with a particular code indicium of the matching member that is the correct identifying code indicium of the owner.

2. An improved identifying credit card as defined in claim 1 wherein said card body has opposed substantially planar wide side faces and surrounding narrow edge faces, the code indicium on said card body is positioned along an edge thereof, and the matching member has a cooperating edge along which its code indicia is positioned.

3. An improved identifying credit card as defined in claim 2 wherein, the matching member has an open compartment portion for receiving said card body therein, and the matching member has an offset portion adjacent said open compartment portion for the insertion of an object beneath said card body to facilitate its removal from said open compartment portion.

4. An improved identifying assembly for determining whether the holder of a credit card is the proper owner thereof which comprises, a card body having an incorrect code indicium thereon, a matching member having a series of code indicia thereon, and means for accurately aligning said card with said matching member with the incorrect code indicium indicating a correct identifying code indicium of the series on said matching member.

5. An improved identifying credit card for placement in an edgewise-aligned relation with a matching receiver having indicator compartments provided with code indicia in alignment along at least one edge thereof and having an offset edge portion which comprises, a card body having opposed upper and lower substantially planar wide side faces and polygonal surrounding narrow edge faces, indicator compartments on the upper side face adjacent to and open along at least one edge face of said card body providing a group of compartments within at least one of which a code indicium may be placed on said upper side face, said card body having at least one offset edge portion constructed and adapted to interfit in a complementary manner with the offset edge portion of the matching receiver for accurately-aligning the compartments of said card body with the indicator compartments of the matching receiver when said card body is placed in an edgewise-aligned position with respect thereto.

6. An improved identifying credit card assembly for checking to determine whether the holder of a credit card is the proper owner thereof which comprises, a card body having opposed upper and lower substantially planar wide side faces and surrounding narrow edge faces, a card receiver having a substantially planar upper face and an open central portion to receive said card in an edgewise-aligned relation therewith, the planar upper face of said receiver having spaced-apart code indicia therealong in alignment with an edge of said open central portion thereof, the upper of said side faces of said card body having at least one code indicium adjacent an edge face thereof for aligning with one code indicium of said receiver to check the ownership of the card, said receiver and said card body having complementary offset edge portions for interfitting with each other when the card body is placed within said open central portion to assure proper alignment of said card body and its indicium with said one code indicium of said receiver.

7. An improved identifying credit card assembly as defined in claim 6 wherein, said complementary offset portion of said card body is a slotted portion adjacent a corner edge thereof, and said complementary offset portion of said receiver is a projection adjacent a corner edge of said central open portion thereof.

8. An improved identifying credit card assembly as defined in claim 6 wherein, said open central portion of said receiver is of substantially rectangular shape and is provided with a substantially planar bottom portion to receive and position the lower of said wide side faces of said card body thereon, and the depth of said open central portion corresponds substantially to the thickness of said card body, so that when said card body is placed in said open central portion, its said upper side face will be in substantially planar alignment with said planar upper face of said receiver.

9. An improved identifying credit card assembly as defined in claim 6 wherein, said card body has a polygonal shape as defined by its said narrow edge faces, said open central portion of said receiver is of substantially complementary polygonal shape with respect to said card body and has a substantially planar bottom wall extending depthwise of said planar upper face of said receiver for a distance corresponding substantially to the thickness of said card body, and said receiver has a downwardly-offset portion therein open to an end of said open central portion thereof and connected to said planar bottom wall for the insertion of a finger to facilitate the removal of said card body from said receiver.

10. An improved identifying credit card assembly as defined in claim 6 wherein, said receiver is a relatively flat plate member having transversely spaced-apart lines extending from said open central portion thereof to define indicia-receiving compartments therealong, an individual distinguishing code letter is positioned within each of said compartments on said upper side face of said receiver, said card body has spaced-apart transverse compartment-defining lines extending from its said narrow edge faces along said upper side face, at least one distinguishing code letter is placed on said upper side face of said card body within one of the compartments thereof, a support member is positioned beneath said receiver and has a substantially planar central upper face portion to serve as a support for said card body when said card body is placed within said open central portion of said receiver, and said receiver is secured on said support member with its said open central portion in alignment with said planar central upper face portion of said support member.

11. An improved identifying credit card assembly as defined in claim 10 wherein said support member has a depressed portion extending outwardly from its said planar central upper face portion to provide a finger slot beneath said card body when it is placed within said receiver for facilitating its removal from said support member.

12. A method of determining the correct code indicium for the owner of a credit card which comprises, employing an incorrect code indicium in an edge-aligned relation on the card, employing a group of code indicia in an edge-aligned relation on a matching member, placing the card in an accurately-aligned edge-to-edge relation with the matching member, and determining the correct code indicium of the owner from the one code indicium of the group on the matching member that is then in transverse alignment with the incorrect code indicium of the card.

13. An improved method to determine whether a person presenting a credit card is the true owner thereof, wherein the credit card has the true owner's name and a code letter in position on an upper face adjacent a side edge thereof, and wherein the card is to be placed in a matching central opening in a card receiver having a series of code letters along an edge of its central opening which comprises, asking the person presenting the card for the code letter of the card and noting it, inserting the credit card within the central opening of the receiver with its upper face in substantial alignment with an upper face of the receiver, noting the code letter on the receiver that is in alignment with the code letter of the card and determining if it is the same code letter that was given by the person presenting the card and, if it is the same, extending credit to the person and, if it is not, refusing credit to him.

References Cited

UNITED STATES PATENTS 1,404,611 1/1922 Hoag _____ 283—8 X
2,225,297 12/1940 Connor _____ 101—369

FOREIGN PATENTS 940,106 10/1963 Great Britain.

EUGENE R. CAPOZIO, *Primary Examiner.*

W. J. CONTRERAS, *Assistant Examiner.*